No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)
(No Model.) 8 Sheets—Sheet 2.

Fig. 2.

WITNESSES:

INVENTOR
Anton Olekiewicz
BY
ATTORNEYS.

No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)

(No Model.) 8 Sheets—Sheet 3.

Fig. 3.

WITNESSES:

INVENTOR
Anton Olekiewicz
BY
ATTORNEYS.

THE NORRIS PETERS CO., PHOTO-LITHO., WASHINGTON, D. C.

No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)
(No Model.) 8 Sheets—Sheet 4.

Fig. 4.

WITNESSES: INVENTOR
 Anton Olekiewicz
 BY
 ATTORNEYS.

No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)
(No Model.) 8 Sheets—Sheet 5.

Fig. 5.

WITNESSES:

INVENTOR
Anton Olekiewicz
BY
ATTORNEYS.

No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)
(No Model.) 8 Sheets—Sheet 6.

Fig. 6.

WITNESSES:

INVENTOR
Anton Olekiewicz
BY
ATTORNEYS.

No. 661,813.  
A. OLEKIEWICZ.  
APPARATUS FOR MEASURING AND RECORDING GAGE OF RAILWAY TRACKS.  
(Application filed June 12, 1900.)  
Patented Nov. 13, 1900.

(No Model.)  
8 Sheets—Sheet 7.

WITNESSES:  
J. H. Niles.  
M. H. Winkel.

INVENTOR  
Anton Olekiewicz  
BY  
ATTORNEYS.

No. 661,813. Patented Nov. 13, 1900.
A. OLEKIEWICZ.
APPARATUS FOR MEASURING AND RECORDING GAGE OF RAILWAY TRACKS.
(Application filed June 12, 1900.)
(No Model.) 8 Sheets—Sheet 8.

WITNESSES:

INVENTOR

UNITED STATES PATENT OFFICE.

ANTON OLEKIEWICZ, OF WARSAW, RUSSIA.

APPARATUS FOR MEASURING AND RECORDING GAGE OF RAILWAY-TRACKS.

SPECIFICATION forming part of Letters Patent No. 661,813, dated November 13, 1900.

Application filed June 12, 1900. Serial No. 20,018. (No model.)

*To all whom it may concern:*

Be it known that I, ANTON OLEKIEWICZ, a subject of the Czar of Russia, residing at Alee Jerosolimskie 70, Warsaw, in the Kingdom of Poland and Empire of Russia, have invented certain new and useful Improvements in Apparatus for Measuring and Recording the Gage of Railway-Tracks, of which the following is a specification.

This invention relates to an improved device which is attached to a hand railway-car and adapted for measuring the gage of railway-tracks and determining whether the position of the rails at any part thereof has been changed from the normal gage and for recording automatically any change in the gage on a continuously-moving band or tape, so as to produce a graphic representation of the condition of the track and mark at the same time the rails of the track at the points where a considerable change of gage has taken place by means of a suitable marking liquid, so as to permit the quick and convenient finding of these places and the readjustment of the rails at these points.

The invention consists of an apparatus for measuring and recording the gage of railway-tracks which comprises a frame which is supported on the front end of a hand railway-car and provided with inclined traveling wheels having beveled tires that move along the inside of the rail-heads. The traveling wheels are supported in movable frames which are connected with spring-pressed slide-rods, by which the wheels are pressed against the rail-heads. The slide-rod of one of the wheels is connected by suitable gearing with a band or tape unwound from one roll and conducted over guide and tension rolls to a winding-up roll past a marking-pencil operated by the slide-rod of the opposite wheel, so that a continuous curve is drawn on the movable band or tape. In connection with the winding and guiding rolls are arranged small inking-rollers, which transfer lines on the band or tape indicating the normal condition and permissible deviations of the track.

The apparatus is further provided with a tank containing a suitable marking color, said tank being provided with tubes the lower ends of which are held in position close to the webs of the rails and which are closed by suitable clamping devices when the gage is normal, but opened by the shifting of the slide-rods in connection with suitable controlling-springs, so that the marking color is ejected onto the rails wherever the gage of the track has been changed beyond its normal width. When the device is not to be used, the inclined traveling wheels can be raised and supported by suitable hooks, so as to be supported out of contact with the rails, while the entire apparatus can be readily removed from or applied to the front of the hand-car and supported by suitable fastening bolts or brackets of the same.

In the accompanying drawings.

Similar letters of reference indicate corresponding parts.

Figure 2:
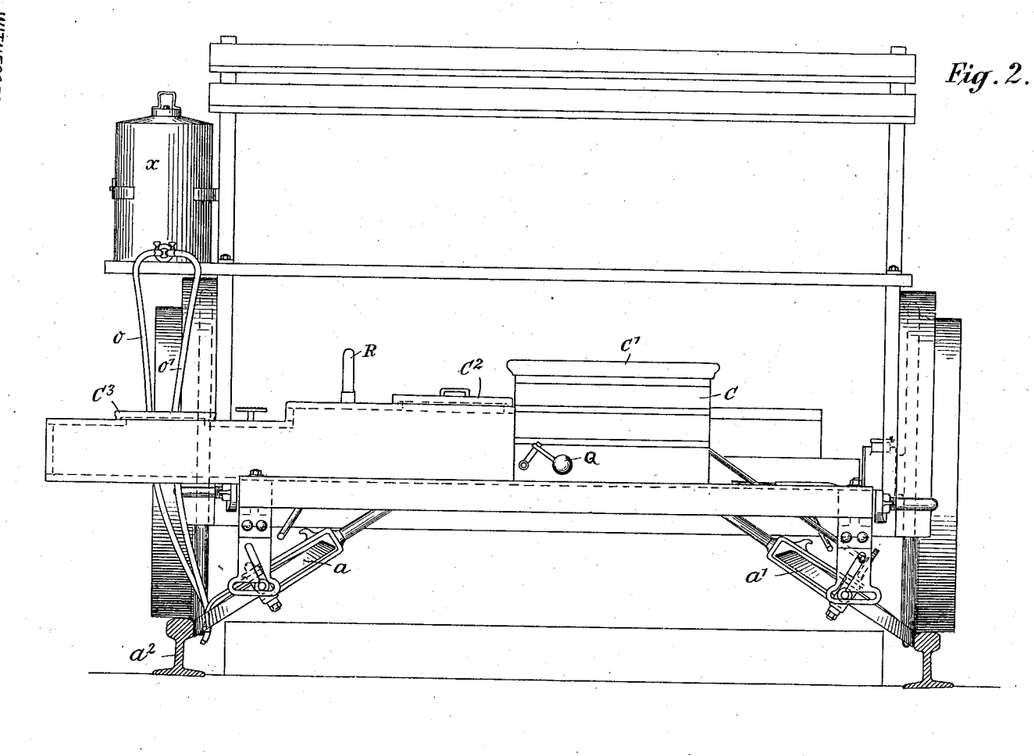
Fig. 2 is a front elevation of Fig. 1.
Figure 8:
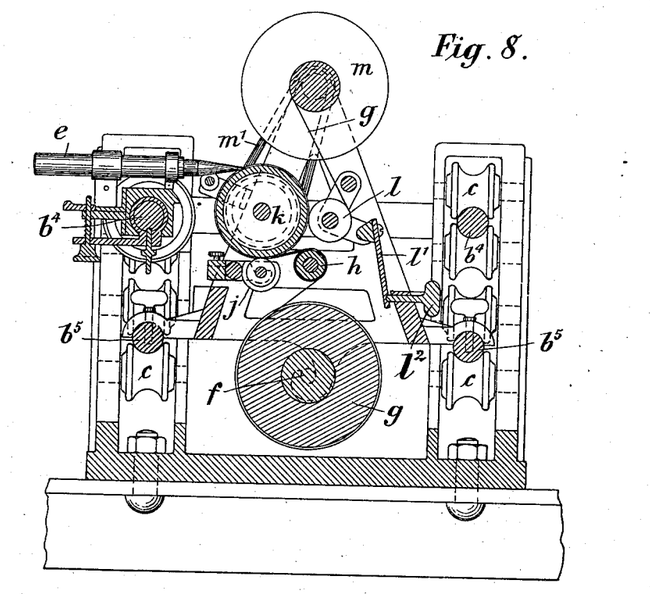

Referring to the drawings, $a$ $a'$ represent inclined wheels which are provided with beveled tires and which are supported so as to travel along the inside of the rail-heads, as shown in Fig. 2. The traveling wheels $a$ $a'$ are supported in inclined holders $b$ $b'$, the shanks of which are connected at their upper ends by cross-pieces $b^2 b^3$ with transverse rods $b^4$ $b^5$, which are arranged parallel to each other between grooved rolls $c$, that are supported in bearings of standards $c'$, arranged on the supporting-frame of the apparatus. The rods $b^4$ $b^5$ are arranged in pairs, the rods $b^4$ being located above the rods $b^5$, as shown clearly in Fig. 8. To one of the upper rods $b^4$ is attached, by means of a suitable clamping device, a marking-pencil $e$, which is located at right angles to the rod $b^4$ and adjusted relatively to a paper band or tape $g$ by a spring-actuated set-screw. The lower pair of rods $b^5$ support a frame in which the unwinding-roll $f$ is supported. The paper band or tape $g$ is conducted from the roll $f$ over guide-roll $h$ and marking-roll $k$ and a second guide-roll $l$ to the winding-up roll $m$. The winding-roll $m$ is arranged vertically above the unwinding-roll $f$, as shown clearly in Fig. 8. The tension-roll $l$ can be adjusted to the marking-roll $k$ by means of a spring $l'$ and set-screw $l^2$, so as to press on the same and exert thereby a certain tension on the band or tape $g$. Below the roll $k$ are arranged on a suitable shaft four small color-rolls $i\ i'\ i^2\ i^3$, which are located in a suitable fountain $j$ and which form contact with the paper band as the same passes over the roller $k$, said color-rollers serving to mark on the paper parallel lines which indicate the extreme limits of permissible deviations of the track. The line which is drawn by the roller $i'$ corresponds to the normal gage of the track, while the line drawn by the roll $i$ indicates the extreme permissible limit of inward deviation and the line drawn by the roll $i^2$ the extreme outward limit of permissible deviation. The line which is drawn by the roll $i^3$ indicates not only the extreme limit of the permissible increase of gage on curves, but serves also for recording the length of the track over which the apparatus has been passed. The paper-rolls $f$ and $m$ may be connected in any approved manner by gears, cords, or otherwise. The proper movement of the rolls and of the paper band or tape $g$ is regulated by the pressure of the roll $l$ against the roll $k$. At one side of the recording device just described is located a cylindrical casing $d'$, in which is arranged a helical spring $d$, which is pressed against two pistons $d^2\ d^3$. The piston $d^2$ is connected by a piston-rod $d^5$ directly with the rods $b^5$, so that the pressure of the spring $d$ on this piston produces the pressing of the traveling wheel $a'$ in the holder $b'$ on the rail-head. The second piston $d^3$ is connected by two draft-rods $d^4$ with the holder $b$ of the other traveling wheel $a$, said draft-rods being regulated by means of the screw Z, so that the pressure of the spring will likewise act on the holder $b$ and press the wheel $a$ toward its rail-head. The degree of shifting motion of the draft-rods $d^3\ d^4$ is indicated by an index $t'$ on a scale $t^2$.

Figure 4:
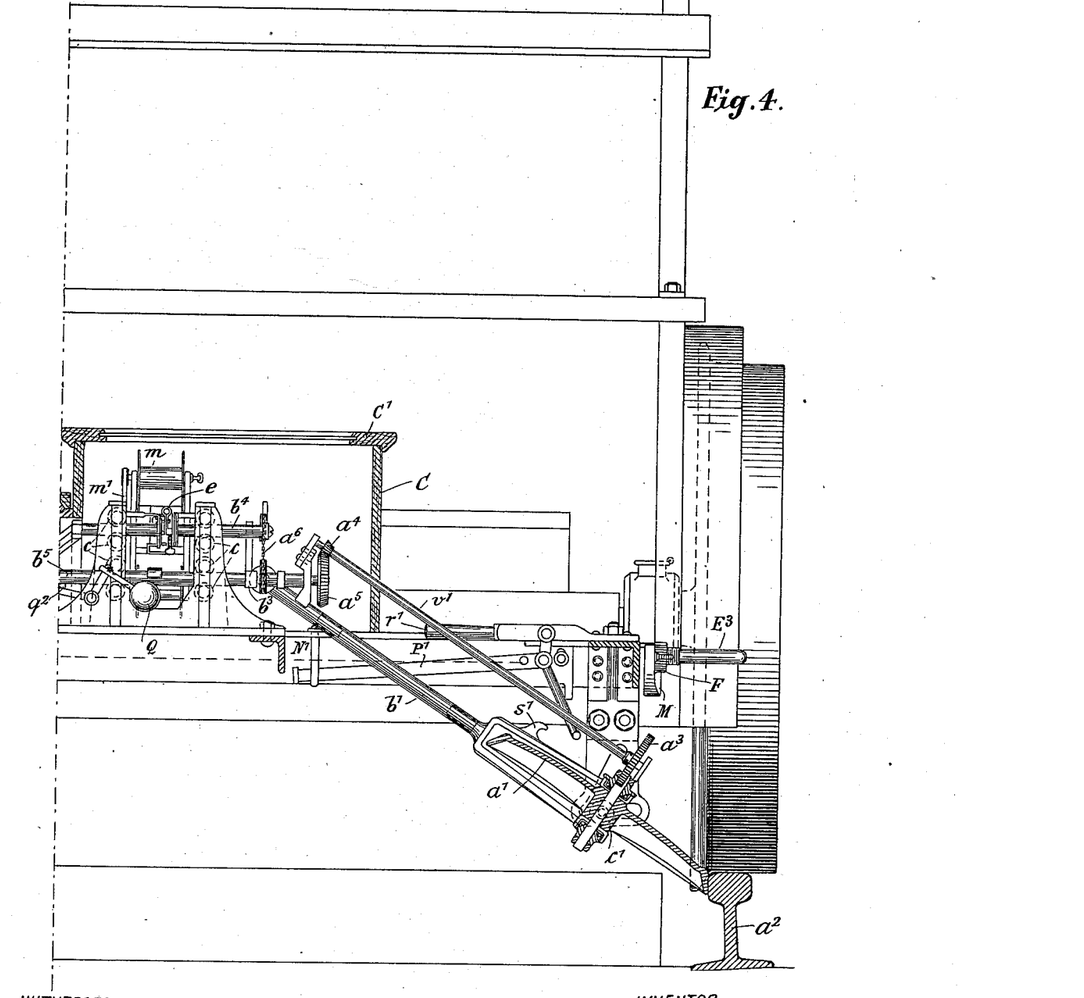
Figure 5:
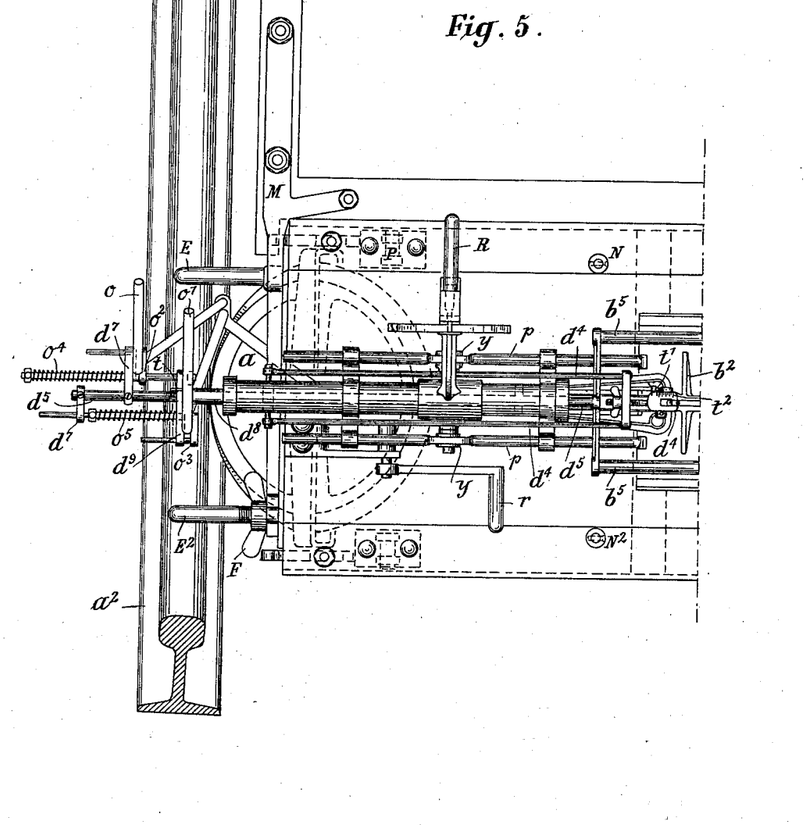
Figs. 5 and 6 are plan views of Figs. 3 and 4.
Figure 6:
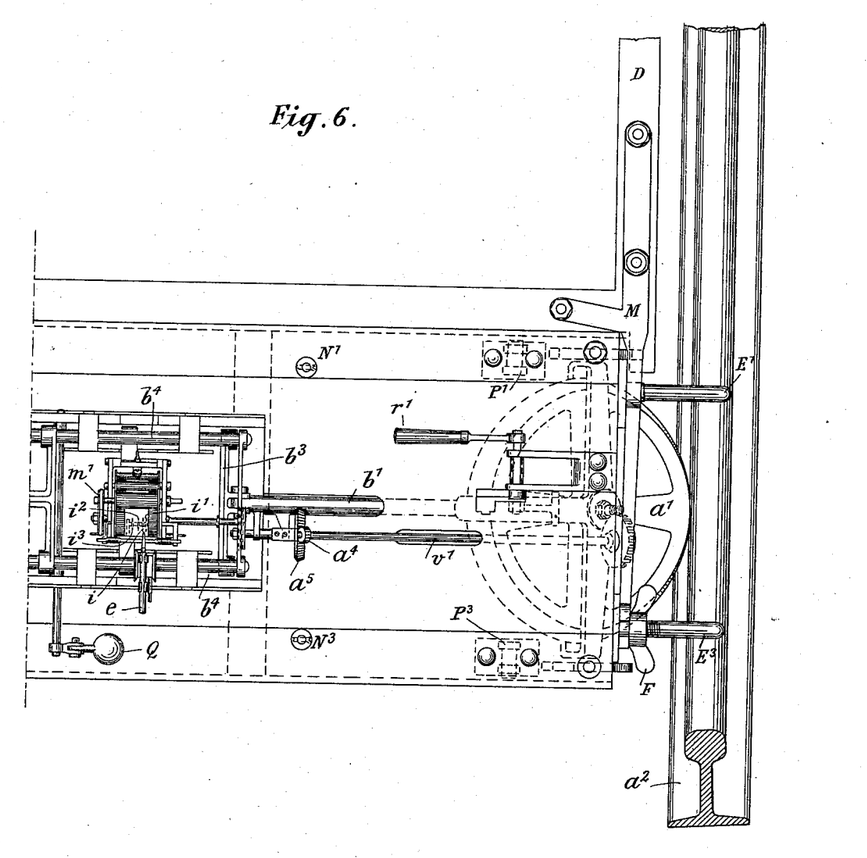
Figure 7:
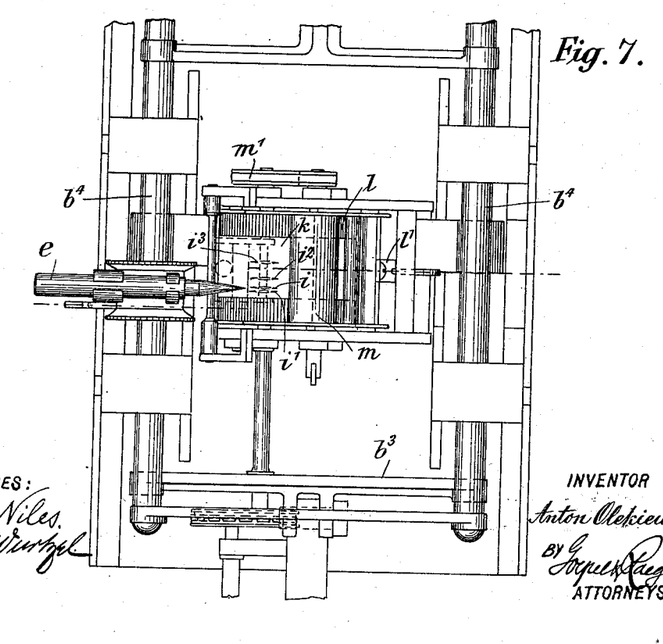
Figs. 7 and 8 are respectively a plan and a vertical transverse section of the marking device drawn on a still larger scale.

Motion is imparted to the paper band or tape $g$ from the traveling wheel $a'$ by means of a worm-gear $a^3$. (Shown in Figs. 2 and 4.) The shaft $v'$ of the worm-wheel $a^3$ carries at its opposite end a bevel gear-wheel $a^4$, which meshes with a bevel-pinion $a^5$, the shaft of which is supported in the holder $b'$. To the shaft of the bevel-pinion $a^5$ is keyed a sprocket-wheel, which transmits its motion by a sprocket-chain to the shaft of the unwinding-roll $f$ and from the same to the winding-up roll $m$ or directly to the same. It appears, therefore, that the paper unwinding and winding-up mechanism is only called into action when the wheels $a\ a'$ are actually in operative contact with the rail-heads.

The webs of the rails are marked with a suitable color whenever the gage of the track deviates considerably from the normal gage. For this purpose a marking device is used, which consists of a cylindrical color-receptacle $x$, which is supported on a shelf of the car and connected by two rubber tubes $o\ o'$ with the rails. The rubber tubes are provided with stop-cocks $n\ n'$ at the points where they are connected with the receptacle $x$. The tubes are closed by means of spring-clamps which are controlled by the spring-actuated pistons $d^2\ d^3$. For this purpose the rod $d^5$ carries at its elongated end two cross-pieces $d^7$, which are provided with holes for the guide-rods of the clamping-jaws $o^2\ o^3$. The clamping-jaw $o^3$ presses against a jaw on one of the cross-pieces $d^7$. To the piston $d^3$ is applied a hollow rod $d^8$, through which the rod $d^5$ is passed. The hollow rod $d^8$ carries a cross-piece $d^9$, which is likewise provided with holes for the guide-rods of the clamping-jaws $o^2\ o^3$ and which forms also the counter-jaw for the jaw $o^3$. On one of the guide-rods of the jaw $o^2$ is placed a spring $o^4$, which presses by one end against a screw-nut on the rod and by its other end against the cross-piece $d^7$ in such a manner that the jaw $o^2$ is pressed against the cross-piece $d^7$. In like manner a spring $o^5$ is arranged on one of the guide-rods of the jaw $o^3$, while a spring is located between the screw-nut and the cross-piece $d^7$, so that the jaw $o^3$ is permanently pressed against the cross-piece $d^9$. When the piston $d^2$ is moved, its rod $d^5$ is moved with the cross-piece $d^7$ in outward direction, so that the marking liquid is permitted to pass through the tube $o$, being ejected at the lower end of the same against the web of the rail, so that this point can be readily found on returning to that part of the track.

Figure 1:
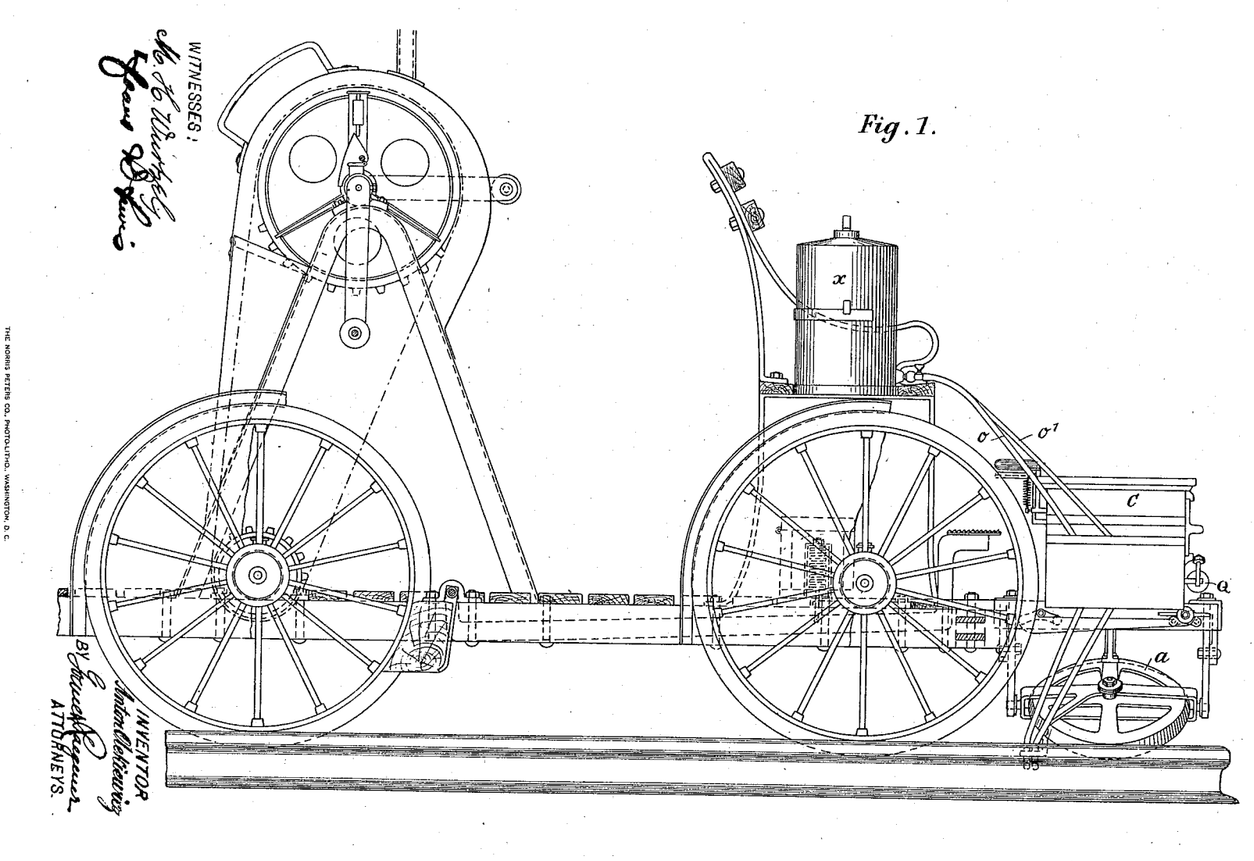
Figure 1 represents a side elevation of a hand railway-car, showing my improved apparatus for measuring and recording the gage of a railway-track arranged at the front end of the same.
Figure 3:
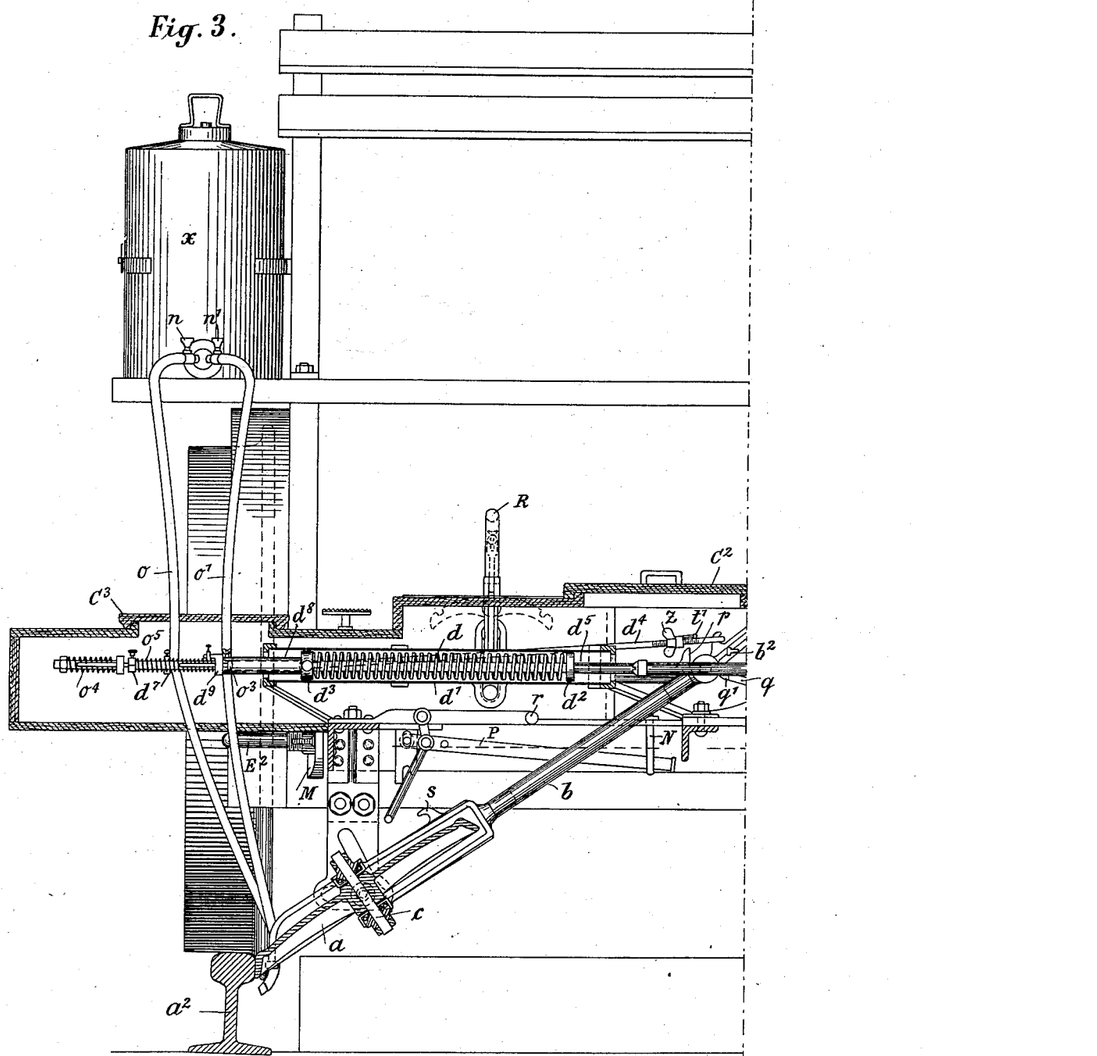
Figs. 3 and 4 are sectional front elevations drawn on a larger scale and representing, respectively, the left and right hand side of the apparatus.

When a switch has to be passed, the handles R are operated, which press by means of the cranks $y\ y'$ on the pushers $p\ p'$ on the arms $b^2$, so that the wheel $a$ can readily pass the switch. The handles R can also be used in the same manner for withdrawing the opposite wheel, so that it clears the switch. By this arrangement it is also possible to prevent the running of the wheels on another track when the device abuts against the switch-tongue. The weight Q, Figs. 1, 2, and 4, serves for the purpose of holding the traveling wheel $a$ in connection with the abutments $q'$ or $q^2$ of the holder $b'$ in normal position. When it is not necessary to measure and record the gage of the track, the traveling wheels $a\ a'$ are moved away from the rail-heads and hung by means of the levers $r\ r'$ and hooks $s\ s'$ on the holders $b\ b'$. Figs. 2 and 3 show the folding legs P P' P² P³ of the apparatus, which support it when it is removed from the hand-car. N N' N² N³ are hooks in which the legs P P' P² P³ are supported after the apparatus is placed in position on the brackets M M' M² M³ of the hand-car. For lifting and carrying the apparatus the handles E E' E² E³ are provided at opposite sides of the same. The front handles E² E³ are provided with clamping screw-nuts F F', which serve for attaching the apparatus to the brackets M M' M² M³ of the hand-car. The entire apparatus is inclosed in a wooden box C, which is provided at its upper part with detachable covers C' C² C³, so as to permit access to the different parts of the apparatus.

Figure 9:
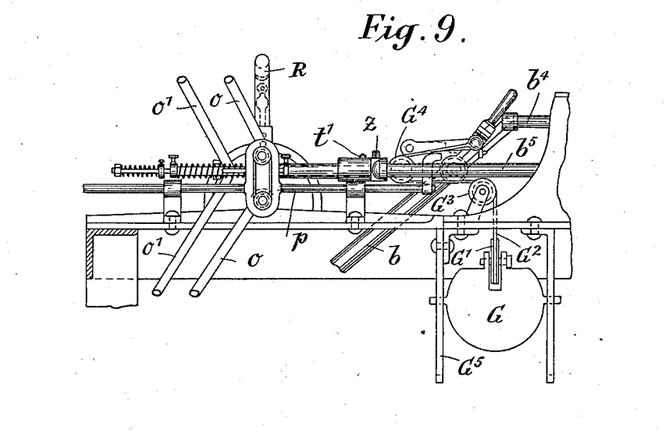
Figs. 9 and 10 are respectively a side elevation and plan of a modified construction of the device for ejecting the marking color on the webs of the rails at abnormally-changed points of the track.
Figure 10:
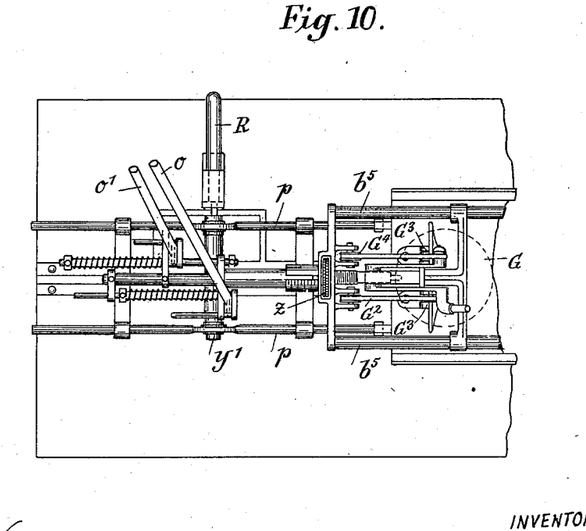

In Figs. 9 and 10 are shown in place of the spring $d$ a weight G, which serves to press, by means of the cord G² and movable rollers G⁴ and fixed rollers G³, the two traveling wheels $a$ $a'$ against the rail-heads. The guide-rods G⁵ serve for the purpose of preventing the rocking of the weight G during the movement of the car over the rails.

Having thus described my invention, what I claim as new, and desire to secure by Letters Patent, is—

1. An apparatus for measuring and recording the gage of railway-tracks, consisting of a pair of traveling wheels moving along the rails, holders for supporting said wheels, slide-rods connecting the shanks of said holders, a spring-actuated mechanism connecting said slide-rods and adapted to press the wheels firmly against the rail-heads, a recording mechanism operated by said wheels for recording the gage of the tracks, substantially as set forth.

2. An apparatus for measuring and recording the gage of railway-tracks, consisting of a pair of traveling wheels moving along the rails, holders for supporting said wheels, slide-rods connecting the shanks of said holders, a spring-actuated mechanism connecting said slide-rods and adapted to press the wheels firmly against the rail-heads, a marking-pencil on one of said slide-rods, a recording mechanism and motion-transmitting mechanism between one of the traveling wheels and the recording mechanism for actuating the same and recording the gage of the track, substantially as set forth.

3. An apparatus for measuring and recording the gage of railway-tracks, consisting of a pair of spring-actuated traveling wheels, a recording device, a motion-transmitting mechanism between one of the traveling wheels and said recording mechanism, and color-rolls for drawing parallel lines on the tape of the recording mechanism, said lines indicating the normal gage and the extreme limits of permissible deviations from the same, substantially as set forth.

4. In an apparatus for measuring the gage of railway-tracks, the combination, with a device for measuring and recording the gage of railway-tracks, having wheels traveling on the rail-heads, of a spring or weight actuated mechanism by which they are pressed against the rails, and a rail-marking device operated by said mechanism when a too great deviation from the normal gage occurs, substantially as set forth.

5. The combination, of incline traveling wheels, moving along the rail-heads, holders for supporting the same, a recording device for the gage of the track, actuated by said wheels, and a lever mechanism for lifting said wheels away from the rail-heads and interrupting the operation of the recording device when the device is to be placed out of operation, substantially as set forth.

6. The combination, with a railway hand-car, having supporting-brackets, of an apparatus for measuring and recording the gage of railway-tracks, provided with handles and pivoted legs, and means for supporting said legs when the apparatus is attached to the car, or releasing the same when removed therefrom, substantially as set forth.

In testimony that I claim the foregoing as my invention I have signed my name in presence of two subscribing witnesses.

ANTON OLEKIEWICZ. [L. S.]

Witnesses:
   BALESKAW NARADZINSK,
   ADAM MICKIEWICZ.